Feb. 19, 1957 C. H. VON SIVERS ET AL 2,782,307
ELECTRONIC SWITCHING DEVICE FOR USE IN RADIO
SYSTEMS AND MULTI-CHANNEL TELEPHONE SYSTEMS
EMPLOYING SUCCESSIVE PULSES
Filed Oct. 10, 1951 2 Sheets-Sheet 1

INVENTORS
CARL HENRIC VON SIVERS
KURT REID WADÖ
KLAS RUDOLF WICKMAN
LARS BERNHARD PERSON
BY Fredrick L. Haus
ATTORNEY INVENTORS
CARL HENRIC VON SIVERS
KURT REID WADÖ
KLAS RUDOLF WICKMAN
LARS BERNHARD PERSON
BY Frederick E. Hane
ATTORNEY 2,782,307
Patented Feb. 19, 1957

2,782,307

ELECTRONIC SWITCHING DEVICE FOR USE IN RADIO SYSTEMS AND MULTI-CHANNEL TELEPHONE SYSTEMS EMPLOYING SUCCESSIVE PULSES

Carl Henric von Sivers, Stockholm, Kurt Reid Wadö and Klas Rudolf Wickman, Hagersten, and Lars Bernhard Person, Stockholm, Sweden, assignors to Telefonaktiebolaget L M Ericsson, Stockholm, Sweden, a company of Sweden Application October 10, 1951, Serial No. 250,672

Claims priority, application Sweden October 12, 1950

4 Claims. (Cl. 250—27)

This invention relates to rapidly responsive electronic switching devices.

In switching devices of the general type, above referred to, diodes are frequently employed. However, diodes and particularly crystal diodes have an appreciable back resistance and also show a parallel capacitance. As a result, an electronic switching device employing diodes does not have an indefinitely high impedance in its interrupted position. This may, for instance, in multi-channel telephone systems, cause cross-talk between different channels when the same are connected to a common point by means of such a switching device.

Tube diodes in switching devices of the general type, above referred to, produce a higher attenuation than crystal diodes by reason of the high back resistance of such tube diodes. However, the use of crystal diodes is preferable for various reasons. Diodes of this type have a long life, require no heating, occupy less space, etc.

The principal object of the present invention is to provide a switching device which affords a very high attenuation in its interrupted position and permits the use of crystal diodes.

The switching device according to the invention is particularly suitable for use in connection with multi-channel telephone systems and radio engineering.

The invention may be broadly defined as comprising—when designed as a four-terminal network—between its input and output terminals two series elements and a parallel element connected to a point common to said elements. The other end of said parallel element is connected to a point having low impedance towards the ground. The individual impedances of the series elements and the parallel element are arranged to adopt a very low and a very high impedance value in such a manner that the impedances of the series elements are very low when the impedance of the parallel element is very high, thereby producing low attenuation between the input and output terminals, and, conversely, that the impedances of the series elements are very high when the impedance of the parallel elements is very low, thereby producing a high attenuation between said terminals.

Figure 1:
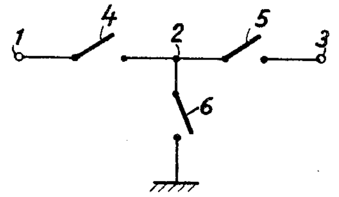
Fig. 1 is a typical circuit diagram of a switching device according to the invention.

Referring now to the figures in detail, Fig. 1 shows a diagram of a circuit switching device according to the invention in form of a T-network in which a point 1 can be connected to a point 3 over current interrupters shown as switches 4 and 5 coupled in series and forming part of the switching device. The point 2 located between switches 4 and 5 can be connected to the ground over a current interrupter shown as a switch 6. When switches 4 and 5 are open switch 6 is closed, and when switches 4 and 5 are closed, switch 6 is open. In the open position, switches 4 and 5 have a relatively high impedance while switch 6, in its closed position, has a relatively low impedance. In such a case, the network shown in Fig. 1 may be considered as a T-network with a very high attenuation. When switches 4 and 5 are closed and switch 6 is open, the network of Fig. 1 may be considered as a T-network with low series impedances and high shunt impedance, and the T-network evidently has a very low attenuation.

Figure 2:
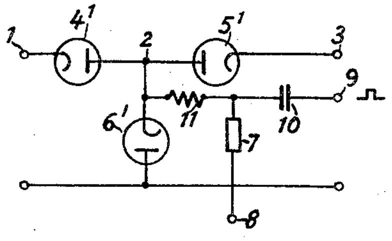
Fig. 2 shows a practical embodiment of a switching device according to the invention.

Fig. 2 shows an embodiment of the device according to the invention in which diodes 4′, 5′ and 6′ replace the respective current interrupters 4, 5, and 6 in Fig. 1. The cathode of diode 6′ is connected through a resistor 7 to a point 8 with a negative potential of some volts relative to ground. The diodes 4′ and 5′ are thereby blocked, and the diode 6′ is conductive. Between the points 1 and 3, the device then provides a very high attenuation. When now at point 9 a positive pulse is applied across a capacitor 10, the point 2 becomes positive relative to ground, and diodes 4′ and 5′ become conductive and diode 6′ non-conductive for the duration of the pulse. As a result, the attenuation between points 1 and 3 becomes very low.

Figure 3:
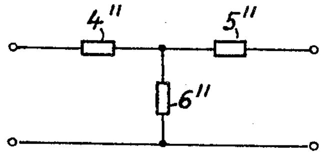
Fig. 3 is a typical circuit diagram of the device according to Fig. 2.

The circuit system of Fig. 2 is shown in Fig. 3 as a T-four-terminal network including series impedances 4″ and 5″ and a shunt impedance 6″.

Figure 4:
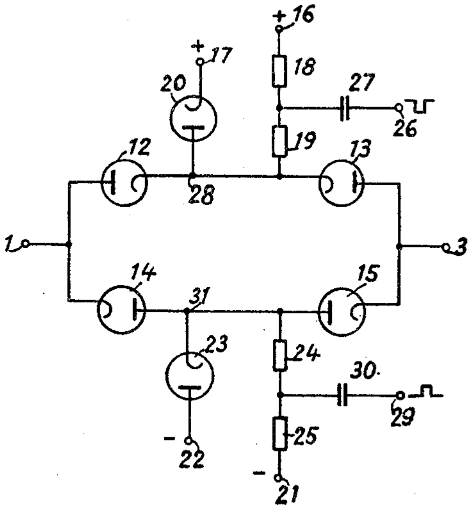
Fig. 4 shows another practical embodiment of a switching device.

Fig. 4 shows another embodiment of the invention in which the switching device is connected between points 1 and 3. The device comprises a branch including diodes 12 and 13 in series connection and a branch parallel thereto including diodes 14 and 15 in series connection. There is further provided a point 16 having a somewhat higher biasing potential than a point 17. Consequently, current will flow from point 16 over resistors 18 and 19 and a diode 20 to point 17. The shunt diode 20 is evidently conductive and its impedance is therefore low while the cathodes of the diodes 12 and 13 have a positive potential with relation to their plates. Hence, diodes 12 and 13 are non-conductive and, therefore, represent high impedances. The device also comprises a point 21 having a more negative bias than a point 22. As a result, a current will flow from point 22 through a diode 23 and resistors 24 and 25 to point 21. The diode 23 is thus conductive and its impedance is low while the plates of diodes 14 and 15 have a negative potential with respect to their cathodes. Thus, diodes 14 and 15 are non-conductive and represent high impedances.

Figure 5:
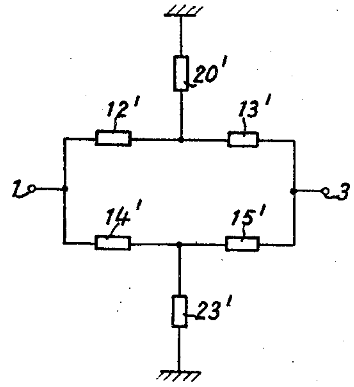
Fig. 5 is a typical circuit diagram of the device according to Fig. 4.

The switching device of Fig. 4 is shown in Fig. 5 in form of two T-networks connected in parallel and in which the series impedances 12′, 13′, 14′, and 15′ are high, and the shunt impedances 20′ and 23′ are low. Therefore, the device affords a high attenuation between the points 1 and 3, between which it is connected.

When now, at a point 26 a negative pulse of sufficient amplitude is applied across a capacitor 27 a point 28 between the cathodes of series diodes 12 and 13 and the plate of shunt diode 20 becomes negative with respect to ground. As a result, series diodes 12 and 13 become conductive and the shunt diode 20 becomes non-conductive. The attenuation between the points 1 and 3 then becomes low for a positive pulse. When a negative pulse having a certain pulse amplitude is applied at point 1, the plate of diode 12 will become negative with respect to its cathode. The diode 12 will thus be blocked with the result that the pulse is cut off. In order to transmit also negative pulses between the points 1 and 3 without cutting the pulses, a positive pulse is applied at a point 29 across the capacitor 30, simultaneous with the negative pulse applied at point 26. This causes series diodes 14 and 15 to become also conductive and the shunt diode 23 to become non-conductive, so that a negative pulse can be transmitted from point 1 to point 3 across series diodes 14 and 15. This arrangement is evidently suitable as a switching device when signals of changing polarity are to be transmitted.

Figure 6:
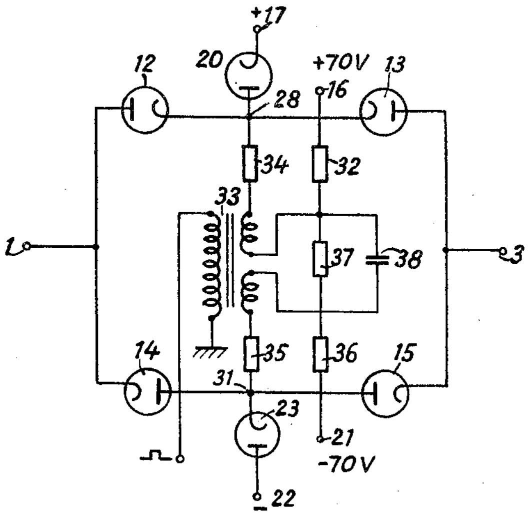
Figs. 6 and 7 show two other practical embodiments of a device according to the invention.
Figure 7:
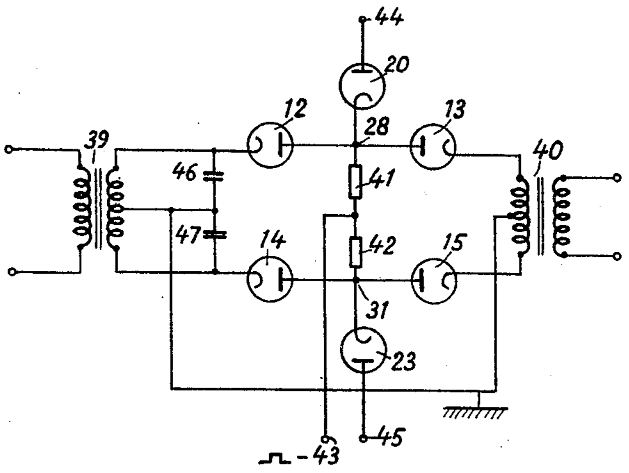

Figs. 6 and 7 show a switching device similar to that in Fig. 4 but in which the application of the pulse which opens or closes the switching device is arranged in a somewhat different manner.

In Fig. 6, the two diodes 12 and 13 are again connected in series between point 1 and point 3 so that the cathodes of these diodes are connected with one another at point 28 and the plate of shunt diode 20 is connected to this point while the cathode thereof is connected to positive bias point 17. 16 has a somewhat higher potential than point 17, which causes a current to flow from point 16 over a resistor 32, one of the partial secondary windings of a pulse transformer 33, a resistor 34 and shunt diode 20 to point 17. As a result, shunt diode 20 becomes conductive and the series diodes 12 and 13 become non-conductive, whereby a high attenuation is obtained between point 1 and point 3 across a T-network consisting of series diodes 12 and 13 and shunt diode 20. In a similar manner, the series diodes 14 and 15 become non-conductive and the shunt diode 23 becomes conductive as the result of a current flowing from point 22 through shunt diode 23, a resistor 35, the other partial secondary winding of the pulse transformer 33 and a resistor 36 to point 21. Hence, this point will lie on a somewhat more negative potential than point 22. The conductive shunt diode 23 and the non-conductive series diodes 14 and 15 form a T-network, which gives a high attenuation between points 1 and 3. The partial secondary windings of transformer 33 are so arranged that, when a positive pulse is applied over the primary winding of the transformer 33, there is obtained at point 28 a negative pulse and at point 31 a positive pulse. As a result, all series diodes 12, 13, and 14, 15 become conductive and both shunt diodes 20 and 23 non-conductive while the pulse continues. The arrangement is thus equivalent to two T-networks connected in parallel according to Fig. 5, wherein the series impedances 12′, 13′, and 14′, 15′ correspond to the series diodes 12, 13, and 14, 15 and are low impedances whereas the shunt impedances 20′ and 23′ are high impedances and correspond to the non-conductive shunt diodes 20 and 23. Thus, while the pulse lasts, there is very little attenuation between points 1 and 3. When the pulse stops, series diodes 12, 13, 14 and 15 become again non-conductive (impedances 12′, 13′, 14′ and 15′ are high), and shunt diodes 20 and 23 become conductive (the impedances 20′ and 23′ are low), whereupon the device again provides a very high attenuation between points 1 and 3. The resistors 34 and 35 are installed for the purpose that the current through the shunt diodes 20 and 23, while the latter are conductive, shall be determined mainly by the resistance of the resistors rather than by that of the shunt diodes. The resistors 34 and 35 may be omitted, if the internal resistance is high in the source of the pulses which feed the primary winding of the transformer 33. A definite rectified potential of the pulses is obtained over resistor 37 and capacitor 38 which are connected parallel to one another and between the resistors 32 and 36. Accordingly, resistors 32 and 36 and the sources of the bias potential 16 and 21 may be entirely omitted, at least for higher pulse frequencies. The rectified potential over the RC-circuit 37, 38 then gives a potential which, even if the pulses fed to the primary side of the transformer should somewhat vary in amplitude, adjusts itself automatically to such an amplitude that, between pulses, the series diodes are always non-conductive and the shunt diodes conductive with high attenuation as a result, while for the time the pulses continue, the series diodes are conductive and the shunt diodes non-conductive with a low attenuation as result.

With the arrangement according to Fig. 6, it is also possible to transmit signals of both, positive and negative polarity from point 1 to point 3 for the time that the device has a low attenuation between these two points.

In the switching device according to Fig. 7, the signal which is to be transmitted, is fed by means of a transformer 39 to the switching device, and taken off by means of a transformer 40. Two T-networks with diodes as series and shunt impedances are connected between the two ends of the secondary winding of transformer 39, the midpoint of the said winding being grounded, and the corresponding ends of the primary winding of transformer 40. The midpoint of the secondary of transformer 39 and the midpoint of the primary of transformer 40 are grounded. The points 28 and 31 at which the plates of the series diodes 12, 13, and 14, 15 and the cathode of the shunt diode 20 and 23 respectively in each T-network are coupled are interconnected through two resistors 41 and 42 of equal value. The joining point 43 between these two resistors is connected to a negative bias, and the plates 44 and 45 of the shunt diodes 20 and 23 are connected to a not quite so negative bias. As a result, current will flow from the points 44 and 45 through shunt diodes 20 and 23 respectively and then through resistors 41 and 42 respectively to point 43. The shunt diodes 20 and 23, thereby, become conductive and the series diodes 12, 13, 14 and 15 non-conductive. As a result, an effective blocking is obtained for a signal from the input side of transformer 39 to the output side of transformer 40, and vice versa.

In order to transmit a signal from the input side of transformer 39 to the output side of transformer 40, a positive pulse is applied at point 43. Then, points 28 and 31 become positive relative to ground, shunt diodes 20 and 23 become non-conductive, and series diodes 12, 13, 14 and 15 become conductive. The switching device now provides a low attenuation for a signal from the input side of transformer 39 to the output side of transformer 40 for the duration of the positive pulse.

The end points of the secondary winding of transformer 39 may be connected to ground across capacitors 46 and 47 if the potential fed to transformer 39 has a low frequency with respect to the frequencies of the pulse fed at point 43, thereby providing for the pulse fed at point 43 a path with low impedance to ground. As a result, there is less danger that a pulse fed at point 43 finds its way over to the primary side of the transformer 39.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An electronic switching device in the form of a T-four-terminal network comprising two series branches in parallel connection between the input and output terminals of the switching device, each series branch including two diode means in series connection with each diode means having a cathode and plate, the diode means in one branch being coupled with their cathodes and the diode means of the other branch being coupled with their plates, a first shunt diode means having a plate and cathode connected with its plate to a connection point between the said cathodes of said cathode coupled series branch, a second shunt diode means having a plate and cathode connected with its cathode to a connection point between the plates of said plate coupled diode means, the connection point between the cathodes of the cathode-connected diode means being further connected to a point adapted to be at a first positive potential and the connection point between the plates of said two plate connected diodes being further connected to a point adapted to be at a first negative potential, the cathode of said first shunt diode means being connected to a point adapted to be at a potential less positive than said first positive potential and the plate of said second shunt diode means being connected to a point adapted to be at a potential less negative than said first negative potential for rendering both the shunt diode means conductive and all the series diode means non-conductive, thereby providing a high attenuation between the input and output terminals of the network, and control means for applying in one branch a negative pulse at the connection point between the cathodes of said cathode-connected series diodes and the plate of the first shunt diode means so as to cause the said connection point to become negative, and for applying in the other branch a positive pulse at the connection point between the plates of said plate-connected series diode means and the cathode of the second shunt diode means so as to cause the last mentioned connection point to become positive for rendering all the series diode means conductive and the shunt diode means non-conductive, thereby providing a low attenuation between the input and output terminals of the network for the duration of said negative and positive pulses.

2. A switching device as defined in claim 1, in combination with transformer means having a primary winding and two secondary windings, one end of one of said secondary windings being connected to the connection point of the cathode-connected series diode means and the plate of the respective shunt diode in one branch and one end of the other secondary winding being connected to the connection point of the plate-connected series diode means and the cathode of the respective shunt diode means in the other branch, application of a pulse to said primary winding rendering the device conductive for the duration of said pulse, the other ends of said secondary windings being interconnected so that, upon application of a positive pulse to said primary winding, a negative potential is obtained at the connection point of said cathode connected diodes and a positive potential at the connection point of said plate connected diodes.

3. A switching device according to claim 2 comprising a resistance means and a capacitance means connected in parallel to each other and between said other ends of the secondary windings.

4. An electronic switching device in form of a T-network comprising two series branches in parallel connection between the input and output terminals of the switching device, each branch including two diode means in series connection with each diode means having a plate and cathode, the plates of the diode means in each branch being coupled one with the other, a pair of shunt diode means each having a plate and cathode, one for each of said branches, the coupled plates of the series diode means of each branch being connected to the cathode of a respective one of said shunt diode means and to circuit means including a resistance means for each branch and a common negatively biased point, the plate of each shunt diode means being in circuit with a respective negatively biased point, the said last mentioned negatively biased points having a lower negative bias than said negatively biased common point for causing the shunt diode means to become conductive and the series diode means to become non-conductive, thereby providing a high attenuation between the terminals of the network, and means for applying a positive pulse to said negatively biased common point so as to render positive the connections common in each branch for the plates of the series diode means and the cathode of the respective shunt diode means, thereby causing the shunt diode means to be non-conductive and the series diode means to be conductive for providing a low attenuation between the end terminals of the switching device.

References Cited in the file of this patent

UNITED STATES PATENTS

| | | |
|---|---|---|
| 2,258,732 | Blumlein et al. | Oct. 14, 1941 |
| 2,266,509 | Percival | Dec. 16, 1941 |
| 2,281,395 | Travis | Apr. 28, 1942 |
| 2,535,303 | Lewis | Dec. 26, 1950 |
| 2,557,729 | Eckert | June 19, 1951 |
| 2,575,904 | Bischoff | Nov. 20, 1951 |
| 2,576,026 | Meacham | Nov. 20, 1951 |
| 2,622,193 | Clayden | Dec. 16, 1952 |